UNITED STATES PATENT OFFICE.

ALAN A. CLAFLIN, OF CONCORD, MASSACHUSETTS, ASSIGNOR TO LACTIC PROCESS COMPANY, A CORPORATION OF NEW JERSEY.

PROCESS OF MANUFACTURING LACTATES.

No. 861,163.      Specification of Letters Patent.      Patented July 23, 1907.

Application filed June 14, 1907. Serial No. 378,915.

*To all whom it may concern:*

Be it known that I, ALAN A. CLAFLIN, a citizen of the United States of America, residing at Concord, in the county of Middlesex and State of Massachusetts, have invented certain new and useful Improvements in the Art of Manufacturing Lactic Acid, of which the following is a specification.

This invention relates particularly to the manufacture of lactic acid by what is known as the fermentation process which may briefly be described as follows:— The raw material for this purpose is starch which has been converted by well-known methods into the fermentable sugars, such as dextrose, lævulose, maltose, etc. These may conveniently be designated by the generic name of glucose. A solution of such glucose constitutes a fermentable wort which is set into action by impregnation with bacteria suitable for inducing the fermentation resulting in the production of lactic acid. But inasmuch as the presence of free lactic acid beyond a relatively small amount in the solution tends to obstruct the progress of fermentation, it is customary to neutralize the excess of such acid by introducing into the solution at proper intervals an alkaline reagent in suitable quantity. Calcium carbonate is commonly used for this purpose. Hence, at the termination of the fermentation by the exhaustion of the glucose, there results from the progressive neutralization of the excess of lactic acid, a final solution wherein such acid exists mainly in the form of neutral lactate which in the case specifically mentioned is calcium lactate. This solution is then concentrated by evaporation and is afterwards treated with sulfuric acid to decompose the calcium lactate and thus to set free again the lactic acid, which is thereupon filtered from the precipitated calcium sulfate, and constitutes the lactic acid of commerce. Now, although it is obviously desirable in this process to conduct the fermentation in a solution containing as large a proportion of fermentable material as possible in order to obtain therein a final percentage of the neutral lactate which would reduce to a minimum the needed subsequent evaporation; yet experience has shown that in solutions containing much over ten per cent of glucose the lactic fermentation proceeds very slowly and is by reason of such slowness exposed to danger of infection from noxious bacteria. Accordingly the manufacture of lactic acid in the most approved form practiced before my present invention, has been carried on in a fermentation-solution containing about ten per cent of glucose, which after being suitably impregnated with lactic bacteria, and allowed to ferment until exhaustion, while excess of free lactic acid has meantime been prevented by concurrent neutralization, has resulted in the production of a solution of neutral lactate containing approximately ten per cent of lactic acid, but somewhat less than that because in practice the yield of lactic acid is never exactly equivalent to the amount of glucose originally present. The solution of neutral lactate thus obtained needs to be concentrated until it contains about twenty per cent of lactic acid, in order to fit it for economical decomposition and to make it yield a product of sufficient strength for commercial acceptability. Such concentration is effected by evaporation in a vacuum pan, but this in turn gives to the resulting solution an undesirably darkened color which injuriously affects the appearance of the final product.

By my invention I obtain the desired augmentation of the proportion of lactic acid contained in the solution without resorting to evaporation and I save thereby both time and expense while securing an improved product. This I accomplish as follows:—It is to be noted at the outset that for the most efficient practice of my improvement the temperature of the fermenting solution should, throughout the entire course of fermentation, be kept well up towards the maximum which the lactic bacteria can endure without detriment to their vitality. I have found that a temperature of 135° Fahrenheit is not too high for satisfactory results and that it is not desirable to let the temperature fall below 125° Fahrenheit. I start with the fermenting wort of the ordinary process containing in solution about ten per cent of glucose, and as this becomes spent by fermentation I add thereto from time to time a quantity of fresh glucose sufficient to restore the proportion of still fermentable material to substantially its original percentage, and meantime I keep the excess of lactic acid already formed properly neutralized. These successive additions of fermentable material are preferably made in the form of a thick solution containing from forty to fifty per cent of glucose, and they are repeated until the total quantity added is approximately equal to the amount of glucose originally present at the outset. After this replenishment has terminated the fermentation is still continued until the remaining glucose has been fully exhausted when the total quantity of lactic acid produced and neutralized will have reached a proportion equal to about twenty per cent of the resulting solution. The product is then ready for the usual decomposition and filtration, and the solution of lactic acid thus produced not only has the consistency of the ordinary commercial article resulting from concentration by evaporation, but is also of lighter color and better appearance than that.

Of course, it is obvious that my herein described method of augmenting the proportion of lactic acid contained in the product resulting from the formation of lactic acid by the process of fermentation and the concomitant neutralization of the same, admits of quantitative variations within relatively wide limits, without departing from its essential character; but it is to be observed that since the fermentation of additional quantities of glucose is necessarily accompanied by a corresponding increase in the amount of neutral lactate present in the solution, and since it is imperative that the neutral lactate should remain completely dissolved in such solution, the amount of possible addition to the fermentable material will diminish in proportion to the depression of temperature which determines the degree of solubility of the neutral lactate before reaching the point of saturation.

I claim:—

1. In the process of obtaining neutral lactate by the lactic fermentation of a wort suitable therefor and the concomitant neutralization of the lactic acid with alkaline reagents, the method of augmenting the proportion of lactic acid contained in the product, which consists in introducing into the fermenting solution additional fermentable material, as the quantity originally present therein becomes diminished by fermentation.

2. In the process of obtaining neutral lactate by the lactic fermentation of a wort suitable therefor and the concomitant neutralization of the lactic acid with alkaline reagents, the method of augmenting the proportion of lactic acid contained in the product, which consists in introducing into the fermenting solution additional fermentable material in such quantity as to maintain at the time of introduction a proportion of fermentable material not substantially greater than that present at the outset, and so proceeding until the total amount to be finally subjected to fermentation is sufficient to produce the desired percentage of lactic acid.

3. In the process of obtaining neutral lactate by the lactic fermentation of a wort suitable therefor and the concomitant neutralization of the lactic acid with alkaline reagents, the method of augmenting the proportion of lactic acid contained in the product which consists in starting with a solution containing at the outset about ten per cent of fermentable material; thereafter introducing into the solution from time to time additional fermentable material to supply the place of that which has already undergone fermentation until the quantity so added shall have amounted in the aggregate to substantially as much more as that originally present; and then completing the fermentation of what remains, while maintaining the temperature of the solution within the limits of from about 125° to about 135° Fahrenheit.

ALAN A. CLAFLIN.

Witnesses:
GEORGE L. ROBERTS,
FLORENCE A. COLLINS.